Figure 1:
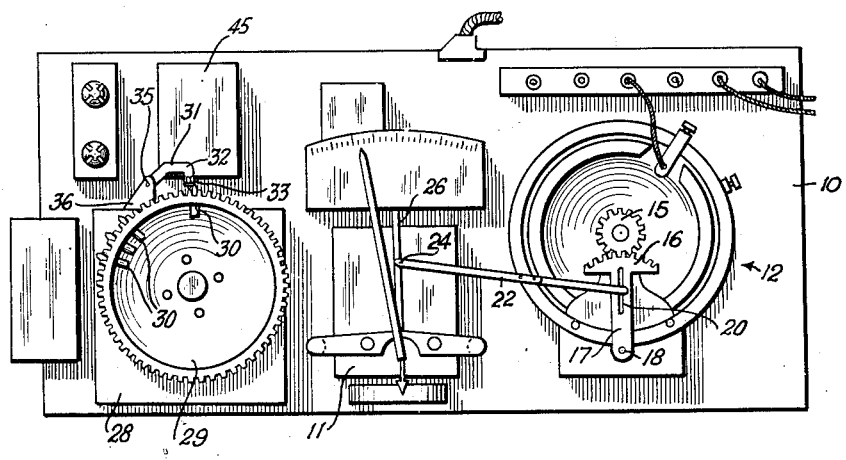

Jan. 12, 1954

R. C. DAVIS ET AL 2,666,173

ELECTRIC MOTOR POSITIONED ACCORDING TO
TIME-TEMPERATURE SCHEDULE

Filed Dec. 16, 1948

2 Sheets-Sheet 1

INVENTORS
Ralph C. Davis
and
Herbert H. Deist

BY
ATTORNEYS

INVENTORS
RALPH C. DAVIS
HERBERT H. DEIST
BY Ely & Frye
ATTYS-

Patented Jan. 12, 1954

2,666,173

UNITED STATES PATENT OFFICE 2,666,173

ELECTRIC MOTOR POSITIONED ACCORDING TO TIME-TEMPERATURE SCHEDULE

Ralph C. Davis and Herbert H. Deist, Akron, Ohio, assignors to The Firestone Tire & Rubber Company, Akron, Ohio, a corporation of Ohio Application December 16, 1948, Serial No. 65,566

3 Claims. (Cl. 318—162)

A primary object of the invention resides in the provision of an improved control for the regulation of temperature, pressure, fluid flow and other controlled functions in respect to a predetermined time base.

The process of curing tires in batch vulcanizing equipment, such as potheaters and vertical vulcanizers, often requires a curing cycle involving abrupt changes in temperature; the temperatures being sharply raised and lowered during the course of the cycle. Heretofore, control apparatus to regulate the operating temperature of such equipment has utilized contour cams in an attempt to produce the required cycle. Such cams, however, are capable of producing abrupt changes in temperature in only one direction, the nature of the cam precluding equally sharp changes in the other direction. For example, a typical curing cycle requires the temperature be raised to 250° F. and maintained for 50 minutes, abruptly raised to 280° F. and maintained at that level for 30 minutes, quickly dropped to about 250° F. for 90 minutes, and then dropped to room temperature to terminate the cycle. For best results it is desirable to effect these temperature changes as rapidly as possible. A contour cam instrument which would be effective in raising the temperature from 250° F. to 280° F. would not be effective in sharply dropping the temperature from 280° F. to 250° F., or in the alternative, if it were able to drop the temperature from 280° F. to 250° F., it would not be effective in quickly raising the temperature from 250° F. to 280° F. Since for best curing results it is desirable that the temperature changes for such a cycle be effected as rapidly as possible, a contour cam instrument is not satisfactory.

A general object of the invention, therefore, is to produce control apparatus which will effect very rapid changes in the operating temperatures of vulcanizing equipment and the like with equal ease in both directions, i. e. in both raising and lowering the temperature.

Another object is to improve time-temperature control mechanisms of the general type described in U. S. Patent No. 2,232,202 to R. D. Bean. More specifically, it is an object of the invention to eliminate the limitations inherent in prior art devices in which the speed and position of a reversible motor are determined by a contour cam precluding abrupt control changes due to the nature of such a cam.

A further object is to provide an improved control mechanism wherein the so-called temperature set-point may rapidly be changed within the temperature range of the mechanism.

Another object is to provide control apparatus which will permit rapid pre-setting or program changing to meet varying requirements.

Another object of the invention is to provide an improved control mechanism in which a desired time-temperature program may be set up by means of accessible manual controls and without requiring the cutting or altering of contour cams.

A still further object is to improve and simplify time-temperature and like control instruments for any one or more of the above stated objects. Other objects and advantages readily will become apparent to persons skilled in the art upon examination of the drawings, specification, and appended claims.

Figure 2:
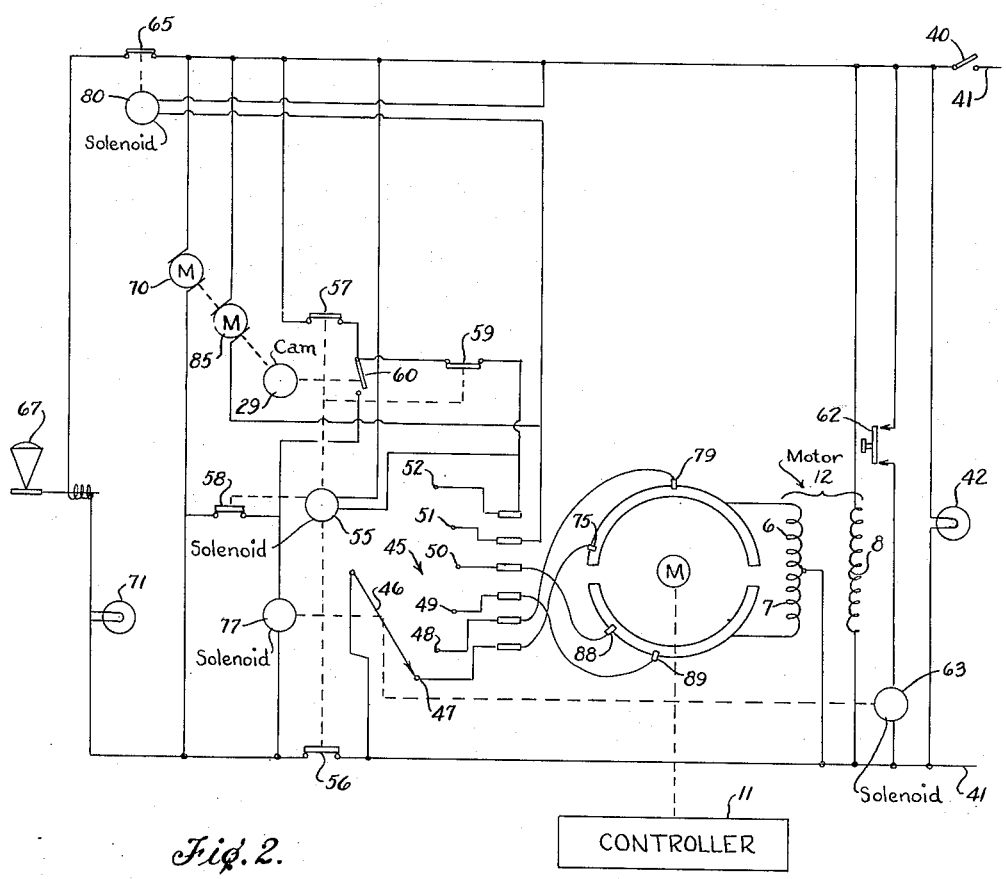

Referring to the drawings, in which like parts are identified by the same reference numerals;

Fig. 1 is an elevational view of a timing mechanism incorporating the present invention; and Fig. 2 is a schematic wiring diagram of the device of Fig. 1.

Although the invention is described with reference to the operation of vulcanizing equipment, it will be apparent that its use is not so limited but may be advantageously used for the control of other equipment in other manufacturing processes. Essentially the invention comprises a clock mechanism, indicated generally at 28, which measures the duration of each step of a curing cycle and a temperature regulating mechanism which determines the temperature of each step in the process.

The temperature regulating mechanism comprises a step relay 45, see Figure 2, which is operated by the clock mechanism 28 in accord with any desired operating program. The step relay controls the operation of a positioning motor 12 which in turn operates a conventional temperature controller 11 which regulates the flow of steam to the vulcanizing equipment to produce the desired temperatures.

The positioning motor 12 is a shaded pole reversible motor capable of stalling at any desired position. For each position of the motor there is a corresponding setting of the controller 11 and hence for each position there is a corresponding vulcanizing temperature. The motor takes its position as determined by whichever of a plurality of adjustable contacts, 75, 79, 88 and 89, is made effective by the step relay. Adjustment of the clock mechanism 28 determines the times at which the step relay and the motor function. Adjustment of the contacts associated with the positioning motor determines the temperatures for each step in the cycle. The two adjustments of time and temperature can be made independently so that any desired operating cycle can be produced.

Now referring in detail to the drawings, and particularly to Figure 1, it will be seen that a preferred form of the invention includes a support panel 10 upon which is mounted the conventional temperature regulator 11, the positioning motor 12 and the clock mechanism 28. The temperature regulator 11 and the motor 12 are connected by a mechanical linkage which includes an armature shaft pinion 15 having engagement with segmental gear portion 16 of an arm 17 pivoted at 18. Arm 17 has a longitudinally extending slot 20, in which a pin, carried by one end of an elongate connector arm 22, projects to provide a pivotal connection between arms 17 and 22. Arm 17 preferably is adjustable along slot 20 to fix the pivot in any desired position therein, the specific means for adjustment not being shown since several are well known and do not form a part of the present invention. The opposite end of arm 22 pivotally connects, at 24, to a temperature setting stylus or control lever 26 in any suitable manner whereby a reciprocating movement of arm 22, when driven in either direction by the reversible motor 12 through arm 17, operates control lever 26 to effect adjustment of the temperature.

The clock mechanism 28 comprises a disc 29 driven at a regulated speed and provided with a serrated periphery adapted to receive, at spaced points about its periphery, cam elements 30. The cams 30 are mounted radially of the disc and extend outwardly of the serrated peripheral portion thereof to engage a complementary cam trip lever 31 during the continuous movement of disc 29 in a clockwise direction as viewed. Lever 31 includes a depending arm portion 32 provided with a suitable cam follower element 33, and an opposite end portion, pivoted at 35 to a suitable mounting bracket 36. Tripping of lever 31 momentarily closes a normally open switch 60 which is in the same circuit as a relay solenoid 77 which operates the step relay.

The repeated tripping of lever 31 by the cams 30 acts to operate the step relay causing the relay arm 46 to move successively into contact with the relay contacts 47, 48, 49, 50, 51, and 52. The timed operation of the relay in this manner is determined by the speed of movement of the disc 29 which is driven by either one of two motors, a timing clock motor 70 and a resetting clock motor 85. During the timing cycle the clock motor 70 operates to drive the disc at a constant speed over-running the motor 85. At the end of the cycle, motor 85 takes over and drives the clock in the same direction but at a higher rate of speed until the first lug 30 actuates the switch 60 moving the step relay to the position 52, at which time the motor 85 has served its purpose of resetting the clock and is deenergized to allow the motor 70 to take over once again. The disc 29 is thus driven to zero position by the motor 85; this position being determined by the position of the first lug or cam 30. The resetting operation may be done by the use of two friction motors of the type manufactured by the Haydon Manufacturing Company, Forestville, Connecticut. For example, the use of a Haydon 4100 motor 16 rev./hr. mounted on the same shaft as a Haydon 1600 motor 14 R. P. M. and disc 29 has proven satisfactory. During the operating cycle when temperature control is required, Haydon 4100 motor 70 overruns Haydon 1600 motor 85 which is not operating. When the cycle is completed, the Haydon 1600 motor cuts in at a speed of 14 R. P. M. and overruns the shaft of the Haydon 4100 motor to rapidly rotate the disc 29 around to the zero position in order to reset the cam. This rapid resetting saves a slow turning of the disc to the zero position by the slower Haydon 4100 motor after the end of the cycle and makes it possible to commence a second cycle almost immediately after completion of the first cycle.

As mentioned above the timed operation of the step relay 45 by the clock results in operation of the positioning motor 12 and the temperature regulator 11.

The motor 12 is a shaded pole reversible motor of a type well known in the art. It has a field coil indicated at 8 and two shading coils 6 and 7. The motor takes a position in response to the interaction of the field coil and whichever of the two shading coils happens to be energized. The motor will remain stationary when neither of the shading coils is energized. The shading coils are energized depending upon which of the motor contacts 75, 79, 88, or 89 is energized. Thus, in the position shown in Fig. 2, with the contact arm 46 touching the contact 47, contact 75 completes the circuit through the upper shading coil 6. The field of this shading coil will react with the field coil 8 which is always energized to cause rotation of the motor. This rotation will continue until the contact 75 reaches one of the spaces between the ring segments, at which time the shading coil is deenergized and the motor stops. The motor thus takes its position in accord with whichever of the contacts 75, 79, 88, or 89 is energized and will rotate until that particular contact no longer touches the split ring but is positioned in the gap between the two segments.

In operation, the apparatus works as follows:

With the switch 40 in closed position power will be supplied to the circuit through the lines 41 which are connected to an appropriate source of power, not shown; pilot light 42 will light to indicate that the apparatus is ready for operation. At this time the arm 46 of the step relay will be in contact with contact 52, solenoid 55 will be energized maintaining the switch 56 in open position and the valve 67 will be closed so that the supply of air which is necessary to operate the controller 11 will be cut off.

With the apparatus in this condition, the push button 62 is closed to establish a circuit energizing solenoid 63, which resets the step relay, bringing the arm 46 back to contact 47. This resetting of the step relay causes the positioning motor 12 to take a position determined by the position of contact 75 and corresponding to the initial temperature desired for the first step of the curing cycle. The motor, in taking this position, will through its mechanical linkage with the controller 11 cause the temperature to come to the desired point. At the same time when the arm 46 of the step relay moves away from contact 52 solenoid 55 is deenergized, permitting the switches 56 and 57 to take their normally closed positions. Thus, simultaneously with the resetting of the step relay and the positioning of motor 12, the valve 67 is opened to furnish air to controller 11, and the clock motor 70 is started to drive the disc 29 in its timing movement. At this time the light 71 will indicate that the apparatus is functioning. During this first step of the curing cycle, the temperature of the vulcanizing equipment is at a value corresponding to the position of motor 12 as determined by the step relay arm being in contact with the contact 47.

This condition remains constant until the next succeeding cam 30 positioned on the disc 29 strikes the trip arm 32 to actuate the switch 60 momentarily, causing the solenoid 77 to be energized, and moving the step relay arm to contact 48. At this step of the cycle, the step relay causes the motor 12 to take a position as determined by contact 79 and this movement of the motor causes the controller 11 to effect the next temperature change. The switch 60 is closed only while the cam 30 is in contact with the arm 32 which is just long enough to operate the step relay.

As the disc 29 rotates, it will successively bring the various cams 30 into position to actuate switch 60 repeatedly and produce the changes in the step relay and in the position of motor 12 and correspondingly the changes in the temperature of the vulcanizing equipment.

At the end of the cycle, the contact arm 46 will reach contact 51, at which time the solenoid 80 will be energized to open the normally closed switch 65, closing the valve 67 to stop the operation of controller 11. Light 71 is turned off to indicate this condition. At this time the curing cycle is at an end. At the same time, the contacting of arm 46 with contact 51 will cause the motor 85 to overdrive the clock motor 70 and to reset the clock 28. Motor 85 will operate until the zero cog 30 strikes the limit switch 32, at which time switch 60 will be closed to cause the contact arm 46 to move to contact 52.

This last movement of the step relay arm 46 deenergizes solenoid 80, stops the motor 85 and energizes the solenoid 55, opening switch 56 and switch 57 and closing switches 58 and 59. Switch 59 is provided to prevent a momentary short circuit which might otherwise occur upon the reenergization of the solenoid 55. Closing switches 58 and 59 establishes a circuit reenergizing motor 70, causing it to take up back lash and to run until the next cam 30 opens the switch 60, at which time the motor 70 is stopped with the switch 60 remaining in open position. The apparatus is then in condtion for the next subsequent cycle.

The sequence of steps making up the cycle may be varied as to time by adjusting the position of the various cams on the disc 29, and as to temperature by adjusting the positions of the contacts 75, 79, 88, and 89 relative to the split ring 21. Thus, any desired sequence may be obtained.

While a preferred form of the invention has been described, it will be apparent that various modifications will occur to those skilled in the art without departing from the spirit of the invention or from the scope of the appended claims which summarize the features of the invention.

What is claimed is:

1. A device for the regulation of control apparatus to effect a sequence of settings of said apparatus at preselected time intervals, said device having in combination, a reversible motor of the type adapted for controlled rotation in either direction through predetermined arcs, means for controlling the rotation of said motor including an energizing circuit and an energizable multiple circuit switch in said circuit adapted for step-by-step actuation in response to sequential energization, control circuit means for the energization of said switch, means connecting said multiple circuit switch to said motor in a manner whereby the step-by-step operation of said switch effects a plurality of motor rotations through preselected arcs, means comprising an electrical switch operable in response to a cam lever, a rotatable cam disc mounted on a shaft adapted for constant speed rotation, said cam disc provided with circumferentially spaced lugs to define a cycle of operation for said electrical switch by the actuation of said lever, and means for resetting said cam disc for repetition of said cycle of operation, means connecting said lever actuated switch and said multiple circuit switch in an electrical network for the periodic energization of the multiple circuit switch in response to the timed closing of said lever actuated switch, and means for translating the controlled rotation of said motor to linear displacement to effect regulation of said control apparatus.

2. In combination a controller mechanism requiring adjustment, reversible motor means for the adjustment of said controller device, time clock operated switch means for periodically and selectively effecting predetermined rotation of said motor to effect corresponding adjustments of said controller mechanism, said switch means comprises a lever activated multiple circuit relay having associated therein a time clock, a cam disc driven by said time clock and a plurality of cam elements including a first cam element adjustable circumferentially of said disc to a position for sequential actuating engagement with the lever of said relay to program through a cycle of operation the actuation of said lever and means for accelerated rotation of said cam disc at the end of said cycle operation to a position whereby said lever engages first said cam element to initiate a repetition of said cycle of operation.

3. A device for the regulation of control apparatus to effect a sequence of settings of said apparatus at preselected time intervals, said device having in combination, a reversible motor of the type adapted for controlled rotation in either direction through predetermined arcs, means for controlling the rotation of said motor including an energizing circuit and an energizable multiple circuit switch in said circuit adapted for step-by-step actuation in response to sequential energization, control circuit means for the energization of said switch, means connecting said multiple circuit switch to said motor in a manner whereby the step-by-step operation of said switch effects a plurality of motor rotations through preselected arcs, means comprising an electrical switch operable in response to a cam lever, a rotatable cam disc mounted on a shaft adapted for constant speed rotation, said cam disc provided with circumferentially spaced lugs to define a cycle of operation for said electrical switch by the actuation of said lever, and means for resetting said cam disc for repetition of said cycle of operation, means connecting said lever actuated switch and said multiple circuit switch in an electrical network for the periodic energization of the multiple circuit switch in response to the time closing of said lever actuated switch, means for translating the controlled rotation of said motor to linear displacement to effect regulation of said control apparatus, said means for resetting said cam disc comprising an overrun motor adapted to drive said disc at a speed greater than that at which said disc rotates during said cycle.

RALPH C. DAVIS.
HERBERT H. DEIST.

References Cited in the file of this patent
UNITED STATES PATENTS

| Number | Name | Date |
|---|---|---|
| 1,948,710 | Harte | Feb. 27, 1934 |
| 1,992,327 | Powell | Feb. 26, 1935 |
| 1,997,158 | Thomas | Apr. 9, 1935 |
| 2,083,722 | LaVia | June 15, 1937 |
| 2,135,991 | Nessell | Nov. 8, 1938 |
| 2,192,313 | Huth et al. | Mar. 5, 1940 |
| 2,290,626 | Bosomworth | July 21, 1942 |